No. 744,432. Patented November 17, 1903.

UNITED STATES PATENT OFFICE.

EDGAR ROUSE SUTCLIFFE, OF LEIGH, ENGLAND.

PROCESS OF MAKING ARTIFICIAL STONE, &c.

SPECIFICATION forming part of Letters Patent No. 744,432, dated November 17, 1903.

Application filed February 17, 1903. Serial No. 143,816. (No specimens.)

*To all whom it may concern:*

Be it known that I, EDGAR ROUSE SUTCLIFFE, a subject of the King of Great Britain, residing at Leigh, in the county of Lancaster, England, have invented new and useful Improvements in Processes of Making Artificial Stone from Material Containing Calcareous Cements, of which the following is a specification.

This invention relates to a process for making artificial stone, bricks, paving-flags, and the like in which the binding material is a calcareous cement, preferably that known commonly as "Portland" cement, and has for its object, first, the production of the finished articles in a much shorter space of time; secondly, the production of better goods, and, thirdly, the elimination or reduction of the quantity of waste goods which has hitherto resulted from the imperfect processes at present in use. The materials used for making this class of goods are usually refuse materials—such as destructor clinker, ashes, slag, and the like—though better class material is used for making a better class brick or slab—such, for instance, as sand, gravel, granite chips, and the like. This material has been mixed with a proportion of the cement molded into flags or blocks of the required size and shape and then stacked in suitable places to allow of them becoming set by the natural action of the atmosphere. This is a very lengthy proceeding, cement set in this way not acquiring its full strength until nearly twelve months old, and attempts have been made to expedite it by treatment with heat or steam in receptacles where the blocks may be surrounded with steam of various pressures and temperatures. So far as I am aware, however, no treatment has yet been adopted which is uniformly successful when dealing with calcareous cements, the tendency being for the blocks to burst or crack when subjected to the heat or steam, due probably to the expansion of lime particles therein which have not been wholly slaked.

In the manufacture of goods of this nature by my process the raw material is first thoroughly ground and mixed together, and the cementing medium, preferably in the form of Portland cement, is then added in the proportion, say, of from fifteen to forty per cent. of the mixture, by measure, the particular feature of my invention being that this cement is added in the form of a hot slurry, it having previously been treated by means of heat or steam in the presence of moisture or simply by mixing the cement with boiling water, the mixture being thoroughly stirred all the while to obtain an intimate admixture of the cement and water. The amount of water should be sufficient to form a thick milky liquid or slurry. A small proportion of quicklime may be used in place of a portion of the cement, in which case it helps to keep the slurry at a high temperature. After a short time the cement is ready for use and may be added to the raw material of the artificial stone, or the latter may be added to the cement either in a dry state or after having itself been treated with water. The two should then be thoroughly mixed until the cement is well distributed throughout the mixture. The whole mixture is stirred until in a slurry state preparatory to being molded into slabs or other goods, which may be done by hand or preferably on hydraulic or power machines constructed for the purpose in which considerable pressure is brought to bear on the material in the mold, so that the excess moisture is pressed out. When molded, the blocks of raw material may be taken direct into hardening-chambers for treatment by heat or steam, this only being possible as a result of my preliminary treatment of the cement. Preferably, however, a short period of rest—say of about twelve to twenty-four hours—is allowed. This enables the goods to receive their initial or first set. In some cases immersion of the blocks in water after they have received their initial set may be found of advantage before the blocks are placed in the final hardening-chamber, the treatment having to be varied somewhat to suit the different classes of cement and materials which are made use of. When ready, the molded slabs are placed on suitable wagons and placed in a closed receptacle in which they are subjected to the action of steam, at first gradually and afterward to the full pressure. The pressure employed is preferably from one hundred pounds to one hundred and fifty pounds per square inch, the time usually from five to ten hours. A lower pressure of steam will answer the purpose; but in that case a longer time of treatment is necessary. After the treatment in the hardening-chamber the flags or blocks are fully set and quite hard, approaching in strength the qualities of natural sandstone.

The action of the wet heat in the preliminary treatment of the cement is in order to thoroughly slake every particle of lime there may be present, as it is the expansion of unslaked-lime particles which has hitherto caused the goods to blow or crack when undergoing the hardening treatment. For this reason it is advantageous that the vessel in which the cement is being prepared should be kept heated all the while, the preparation usually occupying a period of about half an hour. This may be done either by applying exterior heat to the vessel, by keeping it full of steam, or by means of heating-coils and the like.

What I claim as my invention, and desire to secure by Letters Patent, is—

1. The herein-described process of manufacturing artificial-stone goods having a calcareous cement as the binding medium, which consists in first preparing the cement in the form of a slurry by boiling it with water, and continuing the heating, mixing it with the raw materials ground to a fine state until the cement is fully incorporated therewith, molding the mixture into blocks of the required shape, and finally stacking the blocks in position to obtain easy access of air thereto.

2. The herein-described process of manufacturing artificial-stone goods having a calcareous cement as a binding medium, which consists in thoroughly grinding and mixing together the raw material, adding thereto a proportion of cement in the form of a slurry previously prepared with hot water and in the presence of heat, further mixing of the materials until the cement is fully incorporated therewith, molding the mixture to the required shapes thereby expelling the excess of moisture out of the material, and finally treating the molded pieces with heat and steam, all substantially as set forth.

3. The herein-described process for manufacturing artificial-stone goods having a calcareous cement as a binding medium, which consists in thoroughly grinding and mixing together the raw material, adding thereto a proportion of cement and quicklime in the form of a slurry previously prepared with hot water and in the presence of heat, further mixing of the materials until the cement and quicklime are fully incorporated therewith, molding the mixture to the required shapes thereby expelling the excess of moisture out of the material, and finally treating the molded pieces with heat and steam, all substantially as set forth.

4. The herein-described process of manufacturing artificial-stone goods having a calcareous cement as a binding medium, which consists in thoroughly grinding and mixing together the raw material, adding thereto a proportion of cement in the form of a slurry previously prepared with hot water and in the presence of heat, further mixing of the materials until the cement is fully incorporated therewith, molding the mixture to the required shapes thereby expelling the excess of moisture out of the material, allowing a short period for the initial setting of the goods and finally treating the molded pieces with heat and steam, all substantially as set forth.

5. The herein-described process of manufacturing artificial-stone goods having a calcareous cement as a binding medium, which consists in thoroughly grinding and mixing together the raw material, adding thereto a proportion of cement in the form of a slurry previously prepared with hot water and in the presence of heat, further mixing of the materials until the cement is fully incorporated therewith, molding the mixture to the required shapes thereby expelling the excess of moisture out of the material, allowing a short period for the initial setting of the goods, the submersion of the goods for a short period in water and finally treating the molded pieces with heat and steam, all substantially as set forth.

6. The herein-described process of manufacturing artificial-stone goods having a calcareous cement as a binding medium, which consists in thoroughly grinding and mixing together the raw material, adding thereto from fifteen to forty per cent. of Portland cement in the form of a slurry previously prepared with hot water and in the presence of heat, further mixing of the materials until the cement is fully incorporated therewith, molding the mixture to the required shapes thereby expelling the excess of moisture out of the material, and finally treating the molded pieces with high-pressure steam for a period of from five to ten hours, all substantially as set forth.

In testimony that I claim the foregoing as my invention I have signed my name in presence of two subscribing witnesses.

EDGAR ROUSE SUTCLIFFE.

Witnesses:
I. H. ELLISON,
H. A. CARR.